US006398920B1

(12) United States Patent
Ohkawa et al.

(10) Patent No.: US 6,398,920 B1
(45) Date of Patent: Jun. 4, 2002

(54) PARTIALLY IONIZED PLASMA MASS FILTER

(75) Inventors: Tihiro Ohkawa, La Jolla; Robert L. Miller, San Diego; Sergei Putvinski, La Jolla; Richard L. Freeman, Del Mar, all of CA (US)

(73) Assignee: Archimedes Technology Group, Inc., San Diego, CA (US)

( * ) Notice: Subject to any disclaimer, the term of this patent is extended or adjusted under 35 U.S.C. 154(b) by 0 days.

(21) Appl. No.: 09/790,357

(22) Filed: Feb. 21, 2001

(51) Int. Cl.$^{7}$ .............................................. B01J 19/08
(52) U.S. Cl. ...................................... 204/156; 422/186
(58) Field of Search .......................... 204/156; 422/186

(56) References Cited

U.S. PATENT DOCUMENTS

| | | | | |
|---|---|---|---|---|
| 3,722,677 A | | 3/1973 | Lehnert | |
| 4,431,901 A | | 2/1984 | Hull | |
| 5,039,312 A | | 8/1991 | Hollis | |
| 5,560,844 A | | 10/1996 | Boulos | |
| 5,611,947 A | | 3/1997 | Vavruska | |
| 5,653,854 A | * | 8/1997 | Miyamoto et al. | 204/156 |
| 6,096,220 A | | 8/2000 | Ohkawa | |
| 6,258,216 B1 | * | 7/2001 | Ohkawa | 204/156 |

* cited by examiner

*Primary Examiner*—K. Mayekar
(74) *Attorney, Agent, or Firm*—Nydegger & Associates

(57) ABSTRACT

A filter and a method for separating ions in a partially ionized plasma according to their mass includes a chamber with crossed electric and magnetic fields established therein. A feed, including metal atoms having ionization potentials in a low range, and gas atoms having an ionization potential in a high range, is introduced into the chamber. An electron temperature below the low range is generated to partially ionize the feed by dissociating the metal atoms from the gas atoms, and by ionizing the metal atoms into light and heavy ions according to their mass to charge ratio. The light and heavy ions are then influenced by the crossed electric and magnetic fields to separate the light ions from the heavy ions.

20 Claims, 1 Drawing Sheet

PARTIALLY IONIZED PLASMA MASS FILTER

FIELD OF THE INVENTION

The present invention pertains generally to filters and methods for separating ions of relatively low mass to charge ratios from ions of relatively high mass to charge ratios. More particularly, the present invention pertains to filters and methods for separating metal ions from a feed source material that includes metal and non-metallic atoms. The present invention is particularly, but not exclusively, useful for separating light metal ions from heavy metal ions in the presence of other gaseous components in the feed.

BACKGROUND OF THE INVENTION

It is known that the constituent elements of a multi-species plasma can be separated from each other in several different ways. One effective way to do this is to separate ions of the elements from each other according to their respective mass to charge ratios. A device and method for this purpose has recently been disclosed in U.S. Pat. No. 6,096,220, which issued to Ohkawa for an invention entitled "Plasma Mass Filter."

This patent is assigned to the same assignee as the present invention, and is incorporated herein by reference for examples of a device and a method for processing a multi-species plasma to separate the ions of a heavy metal from the ions of a light metal.

As a practical matter, the source material for a multi-species plasma that contains both heavy metals and light metals, will contain more than just the metals. Typically, the source material (or feed) will include compounds such as oxides, hydroxides, chlorides or fluorides of the metals. Consequently, in order to fully ionize a source material, it is necessary to ionize all of the constituent elements; both metals and nonmetals. Different elements in a plasma, however, ionize at different electron temperatures. Stated differently, different elements have different ionization potentials.

By definition, the ionization potential of an element is the energy, expressed as electron volts (eV), that is required to detach an electron from a neutral atom. For gaseous elements (e.g. oxygen, chlorine and fluorine) the ionization potentials are relatively high and are between twelve and eighteen electron volts (12–18 eV). On the other hand, the ionization potentials for metals are relatively low and are in a range from four to eight electron volts (4–8 eV).

As a practical matter, the ionization of atoms in a plasma will begin to occur when electrons in the plasma have been heated to an electron temperature that is below the ionization potential of the atoms. This happens because heated electrons will evolve to a Maxwellian distribution at the electron temperature. Thus, for a given temperature, many of the electrons will have higher energy than indicated by the electron temperature. It is these energetic electrons that then do most of the ionization.

The efficacy of a plasma mass filter, such as the one disclosed by Ohkawa and referenced above, relies solely on the ionization of metals in the source material (feed). It does not matter whether gaseous elements in the source material have been ionized. A consequence of this is that, since only the metal elements need to be ionized, lower electron temperatures can be used. Furthermore, energy savings are significant since metal atoms will normally amount to less than half of the atoms in a typical source material and a plasma with lower electron temperature radiates less energy. Importantly, a partially ionized plasma (i.e. one wherein the metals have been ionized, but the gaseous elements of the source material have not) can still be effectively processed in a plasma mass filter for the purpose of separating metal ions from each other according to their respective mass to charge ratios. One caveat here is that the density of the gaseous elements (i.e. neutrals) in the chamber of an operational plasma mass filter may need to be controlled so as not to erode the separation quality.

In light of the above it is an object of the present invention to provide a device and method for separating ions in a partially ionized plasma according to mass to charge ratios that maintain separation quality during their operation. It is another object of the present invention to provide a device and method for separating ions in a partially ionized plasma according to mass to charge ratios that increases the effective throughput. Yet another object of the present invention is to provide a device and method for separating ions in a partially ionized plasma according to mass to charge ratios that reduces processing costs by reducing both the energy cost per ion and the fraction of atoms that need to be ionized. Still another object of the present invention is to provide a device and method for separating ions in a partially ionized plasma according to mass to charge ratios that is easy to use, relatively simple to manufacture and comparatively cost effective.

SUMMARY OF THE PREFERRED EMBODIMENTS

In accordance with the present invention, a partially ionized plasma mass filter includes a substantially cylindrical shaped chamber that defines a longitudinal axis. Magnetic coils are mounted on the chamber to establish a magnetic field (B) in the chamber that is oriented substantially parallel to the chamber axis. Additionally, electrodes are mounted on the chamber to establish an electric field (E) in the chamber that is oriented substantially perpendicular to the chamber axis. Preferably, the electric potential is a positive along the axis and substantially zero at the wall of the chamber. Thus, crossed electric and magnetic field (E×B) are established inside the chamber.

An injector is provided for introducing a feed source material into the chamber along the axis. Specifically, the feed includes metal atoms and non-metallic atoms. For example, the feed may contain metallic oxides, hydroxides, chlorides or fluorides. Importantly, the present invention exploits the fact that the metals have lower ionization potentials than do oxygen or other gaseous elements (e.g. halogens such as fluorine or chlorine). Stated differently, the metals in the feed will have ionization potentials that are in a low range (e.g. 4–8 eV), and the gas atoms will have an ionization potential that is in a high range (e.g. 12–18 eV).

With the above in mind, an antenna is mounted on the chamber to generate an electron temperature that is slightly below the low range, but substantially below the high range. The consequence of this is that the feed source material is only partially ionized. Specifically, the metal atoms are dissociated from the gas atoms and ionized, but the non-metallic atoms are not ionized. Instead, the non-metallic atoms remain as a neutral gas. Specifically, as envisioned by the present invention the metal atoms will include both light and heavy metals. Thus, the metal atoms will ionize into light ions having a relatively low mass to charge ratio ($M_1$) and heavy ions having a relatively high mass to charge ratio ($M_2$).

The crossed electric and magnetic fields inside the chamber will influence the light ions ($M_1$) and the heavy ions ($M_2$) to travel on trajectories that differ according to the mass to charge ratio of the respective ions. Thus, the light ions are separated from the heavy ions. Accordingly, a first collector can be positioned in the chamber to collect the light ions ($M_1$), and a second collector can be positioned in the chamber to collect the heavy ions ($M_2$). In a preferred embodiment of the present invention, the first collector is positioned at an end of the chamber, opposite the injector, to collect the light ions after they have passed through the chamber. In this embodiment, the wall of the chamber between its two ends will serve as the second collector.

In addition to the structure disclosed above for the filter of the present invention, the filter may include a vacuum pump that is connected in fluid communication with the chamber. The function of this vacuum pump is to remove gas atoms (e.g. oxygen, fluorine, chlorine) as they collect near the wall of the chamber. Further, these gas atoms can then be directed back into the chamber to recombine with the light ions and the heavy ions to reform metal oxides (or hydroxides, fluorides, chlorides) which may be more easily removed from the chamber.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENT

Figure 1:
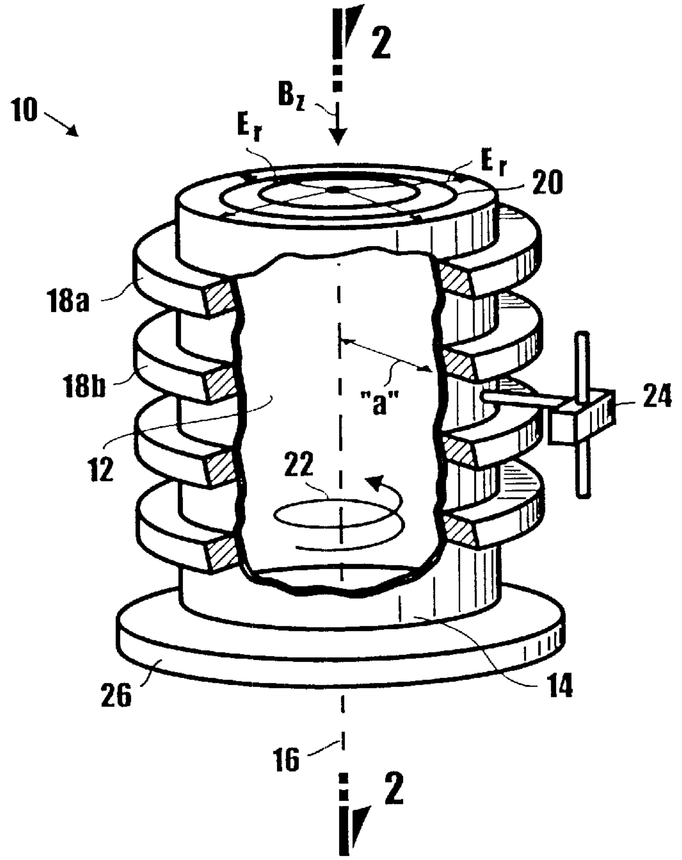
FIG. 1 is a perspective view of the partially ionized plasma mass filter of the present invention with portions broken away for clarity.

Referring initially to FIG. 1, a partially ionized plasma mass filter in accordance with the present invention is shown and is generally designated 10. As shown, the filter 10 includes a plasma chamber 12 that is surrounded by a cylindrical wall 14. For reference purposes, the wall 14 defines a longitudinal axis 16 that extends the length of the chamber 12. As indicated in FIG. 1, the wall 14 is located at a radial distance from the axis 16. For the purposes of the present invention, the radial distance of the wall 14 from the axis 16 is at least equal to a value "a."

A plurality of magnetic coils 18, of which the magnetic coils 18*a* and 18*b* are only exemplary, are positioned outside the wall 14. Specifically, the coils 18 surround the chamber 12 for the purpose of generating a substantially uniform magnetic field, $B_z$, that is axially oriented in the chamber 12. Additionally, an electrode 20 is positioned inside the filter 10 to generate an electric field, $E_r$, that is radially oriented relative to the axis 16 in the chamber 12. It is an important aspect of the present invention that the electric field, $E_r$, be characterized by a positive potential, $V_{ctr}$, on the axis 16, with a substantially zero potential at the wall 14. Accordingly, crossed electric and magnetic fields ($E_r \times B_z$) are established in the chamber 12 which will cause charged particles to travel on spiral trajectories 22 as they transit the chamber 12. Insofar as the transit of charged particles through the chamber 12 is concerned, the particular trajectory 22 taken by a charged particle will depend on its mass to charge ratio. In accordance with the disclosure of U.S. Pat. No. 6,096,220 mentioned above, it is intended for the present invention that charged particles of relatively low mass/charge ratios (light ions: $M_1$) will be confined within the distance "a" as they transit the chamber 12. Thus, the light ions $M_1$ will pass through the chamber 12. On the other hand, charged particles of relatively high mass/charge ratios (heavy ions: $M_2$) will not be so confined. A so-called cut-off mass ($M_c$; where $M_1<M_c<M_2$) can be mathematically defined and determined by the expression $M_c=ea^2(B_z)^2/8V_{ctr}$. In this expression "e" is an electron charge, the wall 14 is at a distance "a" from the longitudinal axis 16, and the magnetic field has a magnitude "$B_z$" in a direction along the longitudinal axis 16.

Still referring to FIG. 1, it will be seen that the filter 10 of the present invention includes a pump 24 that is connected in fluid communication with the chamber 12. Also, an antenna housing 26 is provided. For the purposes of the present invention, any device well known in the pertinent art, such as an r.f. antenna, can be positioned inside the housing 26. In any event, the purpose here is to partially ionize a feed (source material) 28 as the feed 28 is introduced into the chamber 12 (see FIG. 2).

Figure 2:
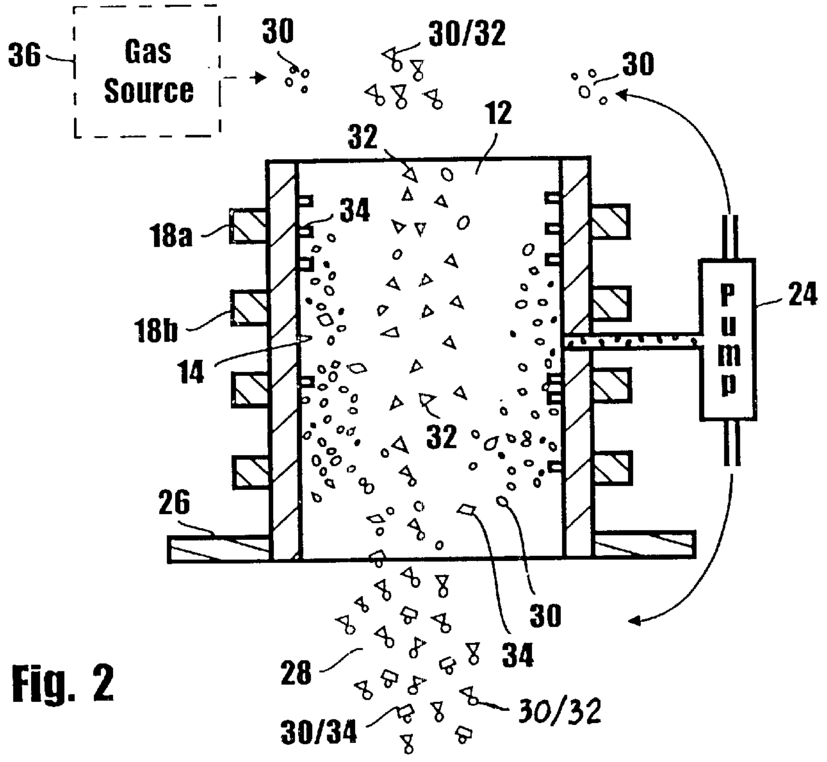
FIG. 2 is a cross sectional view of the filter as seen along the line 2—2 in FIG. 1 with a schematic representation of elements as they are being processed by the filter.

In FIG. 2 it will be seen that the feed 28, as it is introduced into the chamber 12, will include gaseous elements 30, light metal elements 32 and heavy metal elements 34. More specifically, the feed 28 will typically include compounds of these elements such as oxides, hydroxides, chlorides or fluorides of the metals. By way of example, such a compound for a light metal is indicated in FIG. 2 by the combined numeral 30/32, while a compound for a heavy metal is indicated by 30/34.

In the operation of the filter 10 of the present invention, the feed 28 is heated by an antenna in the housing 26 as it is being introduced into the chamber 12. Specifically, as intended for the present invention, the feed 28 will be heated to a temperature that will accomplish two things. First, the constituent elements of the feed 28 will dissociate from each other. Second, the light metal elements 32 and the heavy metal elements 34 will both be ionized to respectively create the light ions $M_1$ and the heavy ions $M_2$. Stated differently, the electron temperature that is used to heat the feed 28 needs to be close to the ionization potentials of both the light metal elements 32 and the heavy metal elements 34. Typically, this means the operational energy level generated by the antenna in housing 26 will be below the low range of four to eight electron volts (4–8 eV).

Although light ions $M_1$ of the light metal elements 32 and heavy ions $M_2$ of the heavy metal elements 34 are introduced into the chamber 12, it is not necessary to ionize the gaseous ions 30. Thus, the electron temperature produced by the antenna in housing 26 can be kept well below the ionization potential of the gaseous elements 30, which will be approximately twelve to eighteen electron volts (12–18 eV). The result is that the gaseous elements remain as neutrals in the chamber 12. Thus, in review, the partially ionized plasma in the chamber 12 includes light ions $M_1$ of the light metal 32, heavy ions $M_2$ of the heavy metal 34 and neutrals of the gaseous elements 30.

During the processing of the partially ionized plasma in the chamber 12, the light ions $M_1$ and the heavy ions $M_2$ will separate from each other according to the mathematical expression disclosed above for the cut-off mass $M_c$. As indicated above, according to this expression, the light ions $M_1$ will transit through the chamber 12 while the heavy ions $M_2$ will be collected on the wall 14 of the chamber 12. As this separation is taking place, the neutrals of the gaseous elements 30 are, of course, also in the chamber 12. It happens that these neutrals will tend to concentrate and become more dense near the wall 14. An adverse consequence of the presence of the neutrals in the chamber 12 is that as they become more dense they are more apt to interfere with the separation process. Thus, in order to avoid an erosion of the separation quality between $M_1$ and $M_2$, the pump 24 is activated to draw the neutrals of the gaseous elements 30 from the chamber 12.

As indicated in FIG. 2, the gaseous elements 30 that have been drawn from the chamber 12 to avoid erosion of the separation quality can be subsequently recombined with light ions $M_1$ of the light metal elements 32 to reform compounds 30/32. As will be appreciated by the skilled artisan, the purpose here is to make it easier for the operator to collect the light metal elements 32 after they have been separated from the heavy metal elements 34. In an alternate embodiment of the present invention, a gas source 36 can be provided for this same purpose. Also, it is envisioned that gaseous elements 30 can also be recombined with the heavy metal elements 34 to facilitate their collection. Further, if desired, some or all of the gaseous elements 30, that are drawn from the chamber 12 by pump 24, can be introduced into the feed 28 to help maintain the feed 28 as a source material.

While the particular Partially Ionized Plasma Mass Filter as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A partially ionized plasma mass filter which comprises:

a chamber;

a means for introducing a feed into said chamber, said feed including metal atoms having ionization potentials in a low range and gas atoms having an ionization potential in a high range, wherein said low range is below said high range;

a means for generating an electron temperature below said low range to partially ionize said feed by dissociating the metal atoms from the gas atoms, and by ionizing the metal atoms into light ions having a relatively low mass to charge ratio ($M_1$) and heavy ions having a relatively high mass to charge ratio ($M_2$);

a means for influencing said light ions and said heavy ions with crossed electric and magnetic fields to separate said light ions from said heavy ions;

a first collector positioned in said chamber to collect said light ions ($M_1$); and a second collector positioned in said chamber to collect said heavy ions ($M_2$).

2. A filter as recited in claim 1 wherein a cylindrical shaped wall surrounds said chamber, with said chamber defining a longitudinal axis, and further wherein said influencing means comprises:

a means for generating a magnetic field in said chamber, said magnetic field being aligned substantially parallel to said longitudinal axis; and a means for generating an electric field substantially perpendicular to said magnetic field to create crossed magnetic and electric fields, said electric potential having a positive value on said longitudinal axis and a substantially zero value on said wall.

3. A filter as recited in claim 2 wherein "e" is an electron charge, said wall is at a distance "a" from said longitudinal axis, wherein said magnetic field has a magnitude "$B_z$" in a direction along said longitudinal axis, wherein said positive potential on said longitudinal axis has a value "$V_{ctr}$", wherein said wall has a substantially zero potential, and wherein said light ions have a mass less than $M_c$, and said heavy ions have a mass greater than $M_c$, ($M_1<M_c<M_2$) and where $$M_c=ea^2(B_z)^2/8V_{ctr}.$$

4. A filter as recited in claim 1 wherein said low range is as low as four electron volts (4 eV) and said high range is as low as twelve electron volts (12 eV).

5. A filter as recited in claim 1 wherein said chamber is defined by a wall and said filter further comprises a vacuum pump connected in fluid communication with said chamber to remove gas atoms near said wall from said chamber.

6. A filter as recited in claim 5 further comprising a means for recombining the gas atoms with said light ions at said first collector.

7. A filter as recited in claim 6 further comprising a means for recombining the gas atoms with said heavy ions at said second collector.

8. A filter as recited in claim 7 wherein said second collector is said wall of said chamber.

9. A filter as recited in claim 1 wherein said gas atoms are oxygen and said feed includes metal oxides.

10. A filter as recited in claim 1 wherein said gas atoms are a halogen gas.

11. A partially ionized plasma mass filter which comprises:

a chamber defining a longitudinal axis;

a means mounted on said chamber for establishing a magnetic field in said chamber, said magnetic field being oriented substantially parallel to said axis;

a means mounted on said chamber for establishing an electric field in said chamber, said electric field being oriented substantially perpendicular to said axis to create crossed electric and magnetic fields in said chamber;

an injector for introducing a feed into said chamber, said feed including metal atoms having ionization potentials in a low range and gas atoms having an ionization potential in a high range, wherein said low range is below said high range; and an antenna mounted on said chamber for generating an electron temperature in said chamber below said low range to partially ionize said feed by dissociating the metal atoms from the gas atoms, and by ionizing the metal atoms into light ions having a relatively low mass to charge ratio ($M_1$) and heavy ions having a relatively high mass to charge ratio ($M_2$), with said light ions and said heavy ions being influenced by said crossed electric and magnetic fields to separate said light ions from said heavy ions.

12. A filter as recited in claim 11 wherein "e" is an electron charge, said wall is at a distance "a" from said longitudinal axis, wherein said magnetic field has a magnitude "$B_z$" in a direction along said longitudinal axis, wherein said positive potential on said longitudinal axis has a value "$V_{ctr}$", wherein said wall has a substantially zero potential, and wherein said light ions have a mass less than $M_c$, and said heavy ions have a mass greater than $M_c$, ($M_1<M_c<M_2$) and where $$M_c=ea^2(B_z)^2/8V_{ctr}.$$

13. A filter as recited in claim 11 wherein said low range is approximately four to eight electron volts (4–8 eV) and said high range is approximately twelve to eighteen electron volts (12–18 eV).

14. A filter as recited in claim 11 further comprising:

a first collector positioned in said chamber to collect said light ions ($M_1$); and a second collector positioned in said chamber to collect said heavy ions ($M_2$).

15. A filter as recited in claim 14 further comprising a vacuum pump connected in fluid communication with said chamber to remove gas atoms from said chamber.

16. A filter as recited in claim 15 further comprising:

a first means for recombining the gas atoms with said light ions at said first collector; and a second means for recombining the gas atoms with said heavy ions at said second collector.

17. A filter as recited in claim 11 wherein said gas atoms are oxygen and said feed include metal oxides.

18. A method for separating ions in a partially ionized plasma according to mass to charge ratios which comprises the steps of:

providing a chamber;

introducing a feed into said chamber, said feed including metal atoms having ionization potentials in a low range and gas atoms having an ionization potential in a high range, wherein said low range is below said high range;

generating an electron temperature below said low range to partially ionize said feed by dissociating the metal atoms from the gas atoms, and by ionizing the metal atoms into light ions having a relatively low mass to charge ratio ($M_1$) and heavy ions having a relatively high mass to charge ratio ($M_2$); and influencing said light ions and said heavy ions with crossed electric and magnetic fields to separate said light ions from said heavy ions.

19. A method as recited in claim 18 further comprising the steps of:

removing gas atoms from said chamber;

recombining a first portion of the gas atoms with said light ions; and recombining a second portion of the gas atoms with said heavy ions.

20. A method as recited in claim 18 wherein said low range is approximately four to eight electron volts (4–8 eV) and said high range is approximately twelve to eighteen electron volts (12–18 eV).

* * * * *